(12) United States Patent
Acker et al.

(10) Patent No.: US 11,619,301 B2
(45) Date of Patent: Apr. 4, 2023

(54) METHOD FOR OPERATING A DUAL-CLUTCH TRANSMISSION FOR RESOLVING RESPECTIVE TOOTH-ON-TOOTH POSITIONS

(71) Applicant: Daimler AG, Stuttgart (DE)

(72) Inventors: Martin Acker, Fellbach (DE); Markus Heinzel, Salach (DE)

(73) Assignee: Daimler AG, Stuttgart (DE)

(*) Notice: Subject to any disclaimer, the term of this patent is extended or adjusted under 35 U.S.C. 154(b) by 194 days.

(21) Appl. No.: 17/282,253

(22) PCT Filed: Sep. 19, 2019

(86) PCT No.: PCT/EP2019/075095
§ 371 (c)(1),
(2) Date: Apr. 1, 2021

(87) PCT Pub. No.: WO2020/069873
PCT Pub. Date: Apr. 9, 2020

(65) Prior Publication Data
US 2021/0341055 A1    Nov. 4, 2021

(30) Foreign Application Priority Data
Oct. 2, 2018 (DE) .................. 10 2018 007 746.3

(51) Int. Cl.
*F16H 61/688* (2006.01)
*F16H 3/00* (2006.01)
*F16H 61/04* (2006.01)

(52) U.S. Cl.
CPC ........... *F16H 61/688* (2013.01); *F16H 3/006* (2013.01); *F16H 61/0437* (2013.01); *F16H 2061/0422* (2013.01); *F16H 2061/0425* (2013.01)

(58) Field of Classification Search
CPC .... F16H 61/688; F16H 3/006; F16H 61/0437; F16H 2061/0422; F16H 2061/0425
(Continued)

(56) References Cited

U.S. PATENT DOCUMENTS 8,594,901 B1 * 11/2013 Yoon ................. F16D 48/00
701/84
9,458,932 B2 * 10/2016 Cho ................... F16H 63/46
(Continued)

FOREIGN PATENT DOCUMENTS

CN      101918740 A    12/2010
CN      102278428 A    12/2011
(Continued)

OTHER PUBLICATIONS

PCT/EP2019/075095, International Search Report dated Dec. 5, 2019 (Two (2) pages).
(Continued)

*Primary Examiner* — Ha Dinh Ho
(74) *Attorney, Agent, or Firm* — Crowell & Moring LLP

(57) ABSTRACT

A method for operating a dual-clutch transmission includes, to resolve a respective tooth-on-tooth position between a toothing of a sliding sleeve and a toothing of a gear wheel during an engaging operation for the respective gear, a relative rotation between the toothing of the sliding sleeve and the toothing of the gear wheel is effected by a twisting torque which acts on the respective gear where the twisting torque is a same size for all of the plurality of gears.

8 Claims, 1 Drawing Sheet

(58) Field of Classification Search
USPC .......................................................... 74/335
See application file for complete search history.

(56) References Cited

U.S. PATENT DOCUMENTS

| | | |
|---|---|---|
| 9,664,277 B1 | 5/2017 | Jeong et al. |
| 10,167,952 B2* | 1/2019 | Cho ...................... F16H 61/688 |
| 10,563,737 B2* | 2/2020 | Hasegawa ........... F16H 61/0213 |
| 2011/0004380 A1* | 1/2011 | Kojima ................ F16D 48/066 |
| | | 701/53 |
| 2015/0127242 A1* | 5/2015 | Iizuka ..................... F16D 48/02 |
| | | 701/110 |
| 2015/0337952 A1* | 11/2015 | Cho ...................... F16H 61/688 |
| | | 701/54 |

FOREIGN PATENT DOCUMENTS

| | | |
|---|---|---|
| CN | 103671746 A | 3/2014 |
| CN | 105723116 A | 6/2016 |
| CN | 107002829 A | 8/2017 |
| CN | 107339423 A | 11/2017 |
| DE | 101 10 898 A1 | 9/2001 |
| DE | 10 2008 043 385 A1 | 5/2010 |
| DE | 10 2013 108 300 A1 | 2/2015 |
| EP | 2 075 492 A1 | 7/2009 |
| WO | WO 2016/078680 A1 | 5/2016 |

OTHER PUBLICATIONS

German-language German Office Action issued in German application No. 10 2018 007 746.3 dated May 28, 2019 (Four (4) pages).
Chinese-language Chinese Office Action issued in Chinese application No. 201980068432.7 dated Dec. 3, 2021 (Seven (7) pages).

* cited by examiner

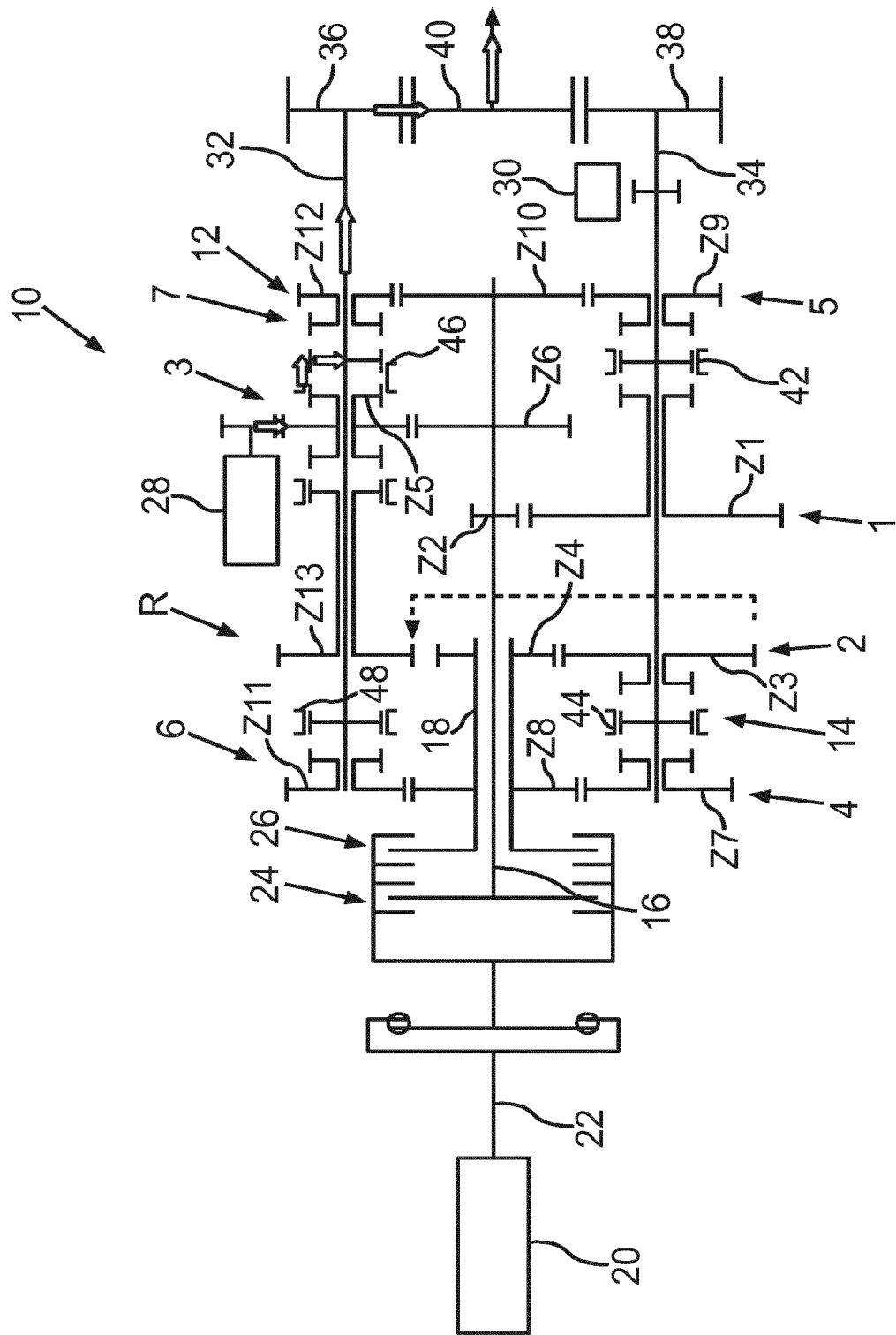

METHOD FOR OPERATING A DUAL-CLUTCH TRANSMISSION FOR RESOLVING RESPECTIVE TOOTH-ON-TOOTH POSITIONS

BACKGROUND AND SUMMARY OF THE INVENTION

The invention relates to a method for operating a dual-clutch transmission, in particular of a motor vehicle.

DE 101 10 898 A1 discloses a method for operating an automatic gearbox.

Moreover, DE 10 2008 043 385 A1 discloses a method for determining the synchronization point of an automatic dual-clutch transmission.

The object of the present invention is to provide a method by means of which particularly advantageous operation of a dual-clutch transmission can be achieved.

In the method according to the invention for operating a dual-clutch transmission, in particular of a motor vehicle, the dual-clutch transmission has two sub-transmissions. The respective sub-transmissions each comprise a friction clutch, also referred to as starting clutch, and an input shaft which can be connected or coupled via the respective friction clutch to an output shaft of a drive engine. As a result, for example, torques which are provided by the drive engine via the drive shaft can be transmitted to the respective input shaft via the respective friction clutch. Moreover, the respective sub-transmission has a plurality of gears with respective gear transmission ratios, each of which gears can be shifted using a friction-synchronized gear clutch. In other words, each gear has a gear transmission ratio, also referred to as transmission ratio, with it being possible for the gear transmission ratios of the gears to differ from one another. The respective gear can be shifted, i.e., engaged and disengaged. It is in particular provided that, when one of the gears is engaged, the other gears of the respective sub-transmission or all other gears of the respective sub-transmission of the dual-clutch transmission are disengaged.

Each gear has a gear clutch in order to shift gears. Further, a sliding sleeve is assigned to each gear. In order to shift the respective gears, the sliding sleeves have sliding sleeve toothings assigned to the gears. Further, the gear wheels of the gears have toothings, which are brought into engagement with the sliding sleeve toothing during gear shifting. Here, the contact surfaces of the toothings of the sliding sleeves and the surfaces of the toothing of the gear wheels which come into contact with the contact surfaces of the sliding sleeve toothing, in particular in a tooth-on-tooth position, are in each case flat or slightly rounded. In other words, the teeth of the toothing of the sliding sleeves are flat or planar or, in particular slightly, rounded on the end face thereof which faces the toothing of the gear wheel. The feature whereby the teeth are slightly rounded on the end face should be understood to mean that the teeth on the end face have a radius for example of at least 5 millimeters (mm), in particular of at least or precisely 8 mm, and preferably of at least or precisely 10 mm. Further, it is preferably provided that the teeth of the toothing of the gear wheel, on the end face thereof which faces the toothing of the sliding sleeve, are flat or planar or else, in particular slightly, rounded. This can also be understood to mean that the teeth of the toothing of the gear wheel on the end face have a radius of at least 5 mm, in particular of at least or precisely 8 mm and preferably of at least or precisely 10 mm. Thus, it is conceivable that for example both the teeth of the toothing of the sliding sleeve and the teeth of the toothing of the gear wheel are flat on the respective end faces thereof, or the teeth of one of the toothings are, in particular slightly, rounded on the end face thereof, while the teeth of the other respective toothing are flat on the end face thereof. This configuration makes it possible to keep the axial installation space requirement particularly low, and at the same time makes it possible to produce smooth and quiet operation.

In the method according to the invention, in order to resolve or eliminate respective tooth-on-tooth positions between a toothing of at least one sliding sleeve and toothings of gear wheels of the gears during engaging operations for engaging the gears, a respective relative rotation between the toothing of the sliding sleeve and the respective toothing of the respective gear wheel is effected by means of a twisting torque which acts on the respective gear, i.e., for example on the sliding sleeve or else particularly on the gear wheel. In other words, during a respective engaging operation during which a respective one of the gears is engaged, a tooth-on-tooth position between a toothing of a sliding sleeve assigned to the respective gear and a toothing of a gearwheel of the respective gear can arise. In order to engage the respective gear, the toothing of the sliding sleeve is brought into, in particular positive-locking, interaction with the toothing of the gearwheel. The gear wheels are also referred to as gear shift wheels. In this regard, the sliding sleeve and thus the toothing of the sliding sleeve are displaced in the axial direction of the gear wheel of the respective gear relative to the gear wheel of the respective gear and in particular are displaced onto the gear wheel or onto the toothing thereof, in particular until the toothing of the sliding sleeve comes into engagement, or is in engagement, with the toothing of the gear wheel.

The above-described tooth-on-tooth position can prevent such a meshing of the toothings; therefore, this should be resolved, i.e., eliminated. The tooth-on-tooth position should be understood to mean that teeth of the toothing of the sliding sleeve are at least partially covered, in the axial direction of the gear wheel toward the toothing of the gear wheel, by teeth of the toothing of the gear wheel. As a result, the teeth of the toothing of the sliding sleeve cannot be inserted in tooth gaps of the toothing of the gear wheel, or the teeth of the toothing of the sliding sleeve cannot be displaced next to the teeth of the toothing of the gear wheel.

Resolving or eliminating the tooth-on-tooth position results in the toothings, in particular in the circumferential direction of the gear wheel or of the sliding sleeve, being twisted relative to one another such that, in the axial direction of the gear wheel towards the toothing of the gear wheel, the teeth of the toothing of the sliding sleeve lie opposite the tooth gaps of the toothing of the gear wheel and not for example opposite the teeth of the toothing of the gear wheel, and so the teeth of the toothing of the sliding sleeve can then be inserted in the tooth gaps of the toothing of the gear wheel, and vice-versa.

In order now to be able to engage the respective gear particularly advantageously, especially particularly quietly and therefore smoothly, in the method according to the invention, the twisting torque acting on the respective gear is the same, or the same size, for all gears. The feature whereby the twisting torque acts on, or is exerted on, the respective gear should be understood to mean that the twisting torque acts on, or is exerted on, the sliding sleeve or preferably on the respective gear wheel, as a result of which the gear wheel and therefore the toothing thereof are preferably twisted in the described way relative to the sliding sleeve and the toothing thereof. The twisting torque here is a torque by means of which the described relative rotation between the gear wheel and the sliding sleeve, and therefore between the toothings, is effected.

Furthermore, the invention provides for a respective clutch torque for the respective friction clutch required to effect the twisting torque to be calculated based on the respective gear transmission ratio. In particular, the respective clutch torque is back-calculated from the respective gear transmission ratio starting from the twisting torque. The feature whereby the twisting torque is the same for all gears should be understood to mean that, upon engaging each gear or for the engagement of each gear of the dual-clutch transmission, the same or identical twisting torque is exerted on, or acts on, the respective gear which is being engaged. The twisting torque is thus for example predefined. The clutch torque which is to be set at that one of the friction clutches which is a component of the sub-transmission whose gear is to be engaged is calculated from the twisting torque using the respective gear transmission ratio, and so the desired twisting torque results from the clutch torque. The concept underlying the invention is that the twisting torque results from the clutch torque, since the twisting torque arises or can be generated from multiplying the respective gear transmission ratio by the respective clutch torque.

The method according to the invention makes it possible to keep the twisting torque the same for each gear upon engaging the gears or in order to engage the gears, and to calculate the clutch torque required for the respective twisting torque in a simple manner. Since it is therefore provided according to the invention that the twisting torque is not for example varied but rather the clutch torque, this makes it possible to ensure particularly advantageous, and especially particularly quiet and smooth, operation of the dual-clutch transmission.

In order to engage the respective gear, the sliding sleeve is moved translationally, i.e., displaced, in the axial direction of the respective gear wheel, in particular relative to the respective gear wheel. In other words, the sliding sleeve is moved axially or displaced axially. It can in particular be provided that, in the respective engaging operation, the sliding sleeve is displaced by means of what is referred to as a gear selector via a selector fork. In the respective engaging operation, the gear selector piston of the respective gear selector is displaced axially, in particular by applying a pressure, in particular a hydraulic pressure, to the gear selector piston. In other words, a fluid, in particular a liquid, is for example applied to the gear selector, in order thereby to axially displace the gear selector and therefore the sliding sleeve. The liquid is preferably an oil. The fluid is pressurized here with the abovementioned pressure, by means of which the gear selector piston and therefore the sliding sleeve are axially displaced. Since each respective sub-transmission has a plurality of gears, the dual-clutch transmission comprises for example a plurality of sliding sleeves and therefore a plurality of gear selectors. The method according to the invention now advantageously enables the maximum pressure level for displacing, i.e., for actuating, the gear selector pistons to be chosen to be the same size for all gear selectors. As a result, a particularly advantageous ratio of an axial displacement force required for displacing the sliding sleeve to the twisting torque required for twisting can be achieved. In particular, when using the method according to the invention, the ratio of the axial displacement force to the twisting torque is the same for each gear. As a result, the gears can be engaged in a particularly quiet and low-load or low-wear manner, such that particularly advantageous operation can be achieved.

The respective gear wheel is in particular an idler wheel which is arranged, in particular mounted, rotatably on a shaft of the dual-clutch transmission, also referred to as gear shaft. By means of the sliding sleeve, the gear wheel can be coupled, in particular non-rotatably, to the gear shaft via the toothings in a positive-locking manner, whereby the respective gear is engaged by coupling the gear wheel to the gear shaft. The method according to the invention further makes it possible to precisely identify and resolve the respective tooth-on-tooth positions in order to securely guide the sliding sleeve into the desired end position thereof and as a result to be able to securely connect the respective gear wheel to the gear shaft.

A further configuration of the invention provides that, in the respective engaging operation, the sliding sleeve is displaced by means of a gear selector.

A further configuration of the invention provides that the twisting torque is solicited by an electronic control unit of the dual-clutch transmission when a position of the gear selector exceeds a predefined threshold value, in particular by a predefined amount.

A further configuration of the invention provides that the twisting torque is solicited by the electronic control unit when a rotational speed difference between the sliding sleeve and the drive engine rotational speed has reduced to a value which is in a range from 10 revolutions per minute inclusive to 40 revolutions per minute inclusive, in particular which is 20 revolutions per minute.

A further configuration of the invention provides that the twisting torque is solicited by the electronic control unit when it is determined that a speed of the gear selector is greater than 20 to 60 millimeters per second, in particular is greater than 40 millimeters per second, a rotational speed difference between the sliding sleeve and the drive engine rotational speed has reduced to a value which is in a range from 10 revolutions per minute inclusive to 40 revolutions per minute inclusive, in particular which is 20 revolutions per minute. And when a position of the gear selector exceeds a predefined threshold value, in particular by a predefined amount.

It is advantageously provided that the twisting torque is solicited by the electronic control unit when it is determined that a speed of the gear selector is greater than 20 to 60 millimeters per second, in particular greater than 40 millimeters per second.

A further configuration of the invention provides that, in the respective engaging operation, the gear selector has a constant hydraulic pressure applied to it from the start of the soliciting of the twisting torque to the end of the engaging operation.

A further configuration of the invention provides that the twisting torque is in a range from five newton-meters inclusive to 15 newton-meters inclusive, in particular is ten newton-meters.

Further advantages, features and details of the invention will become apparent from the following description of a preferred exemplary embodiment and also using the drawing. The features and combinations of features mentioned above in the description, and also the following features and combinations of features mentioned in the description of the figure and/or only shown in the single figure are not only applicable in the respectively stated combinations but also in other combinations or alone, without departing from the scope of the invention.

BRIEF DESCRIPTION OF THE DRAWING

FIG. 1 shows a schematic depiction of a dual-clutch transmission which is operated or can be operated by means of a method according to the invention.

DETAILED DESCRIPTION OF THE DRAWING

FIG. 1 shows a schematic depiction of a dual-clutch transmission 10 for a motor vehicle, in particular for a car, for instance a passenger car. The dual-clutch transmission 10 has a first sub-transmission 12 and a second sub-transmission 14. The sub-transmission 12 has a first input shaft 16 and the sub-transmission 14 has a second input shaft 18. In the exemplary embodiment shown in FIG. 1, the input shaft 18 is a hollow shaft, which is completely penetrated along the axial direction thereof by the input shaft 16.

The dual-clutch transmission 10 is a component of a drive train for driving the motor vehicle. The drive train can have a drive engine 20, also simply referred to as engine. The drive engine 20 is for example an internal combustion engine. Alternatively or additionally, the drive engine 20 may be a reciprocating engine. The drive engine 20 has a drive shaft 22, which is for example designed as a crankshaft. The drive engine 20 can provide torques for driving the motor vehicle via the drive shaft 22, with the torques for driving the motor vehicle also being referred to as driving moments or drive torques.

For producing hybrid vehicles, the dual clutch transmission 10 may additionally have not only an electric machine incorporated into the dual-clutch transmission 10 as shown in FIG. 1 but an electric machine may also be provided incorporated into the drive train on the input side of the first and second friction clutches 24, 26. The electric machine can also be integrated into the dual-clutch transmission at other points or be connected to the crankshaft of the drive engine.

The sub-transmission 12 has a first friction clutch 24 which is also simply referred to as first clutch. The sub-transmission 14 has a second friction clutch 26 which is also simply referred to as second clutch. The clutches are also referred to as starting clutches and are for example designed as multi-disc clutches. It can be seen from FIG. 1 that the input shaft 16 can be connected to the drive shaft 22 via the friction clutch 24. The input shaft 18 can be connected to the drive shaft 22 via the second friction clutch 26. As a result, the driving moments can be transmitted from the drive shaft 22 to the respective input shafts 16 or 18 via the respective clutch.

The dual-clutch transmission 10 has forward travel gears 1, 2, 3, 4, 5, 6 and 7, by means of which a respective forward travel of the motor vehicle can be effected. The dual-clutch transmission 10 also has a reverse gear R, by means of which a reverse travel of the motor vehicle can be effected. Where reference is made hereinafter to a gear, the gear, gears or the gears of the dual-clutch transmission 10, this can be understood to mean the respective forward travel gear 1, 2, 3, 4, 5, 6 and 7 and/or the respective forward gears 1, 2, 3, 4, 5, 6, and 7 and/or the reverse gear R. It can be seen from FIG. 1 that the first sub-transmission 12 comprises the forward travel gears 1, 3, 5 and 7, with the sub-transmission 14 comprising the forward travel gears 2, 4 and 6 and the reverse gear R. The forward travel gears 1, 2, 3, 4, 5, 6 and 7 are also referred to as forward gears. Accordingly, the reverse gear R is also referred to as reverse travel gear.

Moreover, the dual-clutch transmission 10 can comprise an electric machine 28, which for example can be operated in motor mode and thus as an electric motor. In motor mode, the electric machine 28 can provide torques, which can be introduced into the sub-transmission 12. For example, the motor vehicle can be driven by torques provided by the electric machine 28, in particular via the sub-transmission 12. The dual-clutch transmission 10 also has a parking brake 30.

The dual-clutch transmission 10 has a first output shaft 32 and a second output shaft 32. A toothed wheel 36 or 38 is connected non-rotatably to the respective output shaft 32 or 34, with the toothed wheels 36 and 38 simultaneously meshing with a further toothed wheel 40. The toothed wheels 36 and 40 or 38 and 40 form for example a final drive ratio, also referred to as final drive, other than 1. It can furthermore be seen from FIG. 1 that the gears comprise toothed wheels Z1-13. Here, for example, the forward travel gear 1 comprises the toothed wheels Z1 and Z2, the forward travel gear 2 comprises the toothed wheels Z3 and Z4, the forward travel gear 3 comprises the toothed wheels Z5 and Z6, the forward travel gear 4 comprises the toothed wheels Z7 and Z8, the forward travel gear 5 comprises the toothed wheels Z9 and Z10, the forward travel gear 6 comprises the toothed wheels Z11 and Z8, the forward travel gear 7 comprises the toothed wheels Z12 and Z10, and the reverse gear R comprises for examples the toothed wheel Z13 and for example the toothed wheel Z3 and for example the toothed wheel Z4. The toothed wheels Z1, Z3, Z7 and Z9 are gear wheels in the form of idler wheels which are rotatably mounted on the output shaft 34. The toothed wheels Z5, Z11, Z12 and Z13 are gear wheels in the form of idler wheels which are rotatably mounted on the output shaft 32.

In contrast, the toothed wheels Z2, Z6 and Z10 are fixed wheels, which are permanently non-rotatably connected to the input shaft 16. The toothed wheels Z4 and Z8 are fixed wheels, which are permanently non-rotatably connected to the input shaft 18. In order, for example, to be able to selectively connect the toothed wheel Z1 and the toothed wheel Z9 to the output shaft 34, in particular in a positive-locking and non-rotatable manner, a sliding sleeve 42 is provided. The sliding sleeve 42 is therefore assigned to the forward travel gears 1 and 5, or the sliding sleeve 42 can be a component of the forward travel gears 1 and 5. In order to be able to selectively connect the toothed wheels Z3 and Z7 to the output shaft 34, in particular in a non-rotatable and positive-locking manner, a sliding sleeve 44 is provided. The sliding sleeve 44 is therefore assigned to the forward travel gears 2 and 4, or can be a component of the forward travel gears 2 and 4. In order to be able to selectively connect the toothed wheels Z5 and Z12 to the output shaft 32, in particular in a positive-locking and non-rotatable manner, a sliding sleeve 46 is provided. The sliding sleeve 46 is therefore assigned to the forward travel gears 3 and 7, or is a component of the forward travel gears 3 and 7. In order finally to be able to connect the toothed wheel Z11 to the output shaft 32, in particular in a positive-locking and non-rotatable manner, a sliding sleeve 48 is provided. The sliding sleeve 48 is therefore assigned to the forward travel gear 6, or is a component of the forward travel gear 6.

The respective sliding sleeve 42, 44, 46 and 48 can be moved translationally relative to the respective output shaft 32 or 34 in the axial direction of the respective output shaft 32 or 34 and thus be axially displaced. The respective gear can therefore be shifted. In order to engage the respective gear, the respective idler wheel is connected non-rotatably to the respective output shaft 32 or 34 by means of the respective associated sliding sleeve 42, 44, 46 or 48. In order to at least reduce, in particular eliminate, a potential rotational speed difference between the respective output shaft 32 or 34 and the respective idler wheel, and therefore be able to synchronize the respective idler wheel with the respective output shaft 32 or 34, the respective gear has a friction-synchronized gear clutch, by means of which the respective gear can be shifted, in particular engaged.

In the case of a single synchronization, the respective friction-synchronized gear clutch has a respective synchronizer ring, which for example has at least one first friction surface. The method according to the invention is independent of the number of friction surface pairings and can be applied to single or multiple synchronizations. In the case of a single synchronization, the first friction surface is for example conical. Furthermore, the respective gear clutch comprises for example a clutch body of the respective idler wheel, also referred to as gear wheel. The clutch body forms for example a second friction surface, which corresponds in particular to the first friction surface and therefore can also be conical in design. In a sufficiently well-known manner, the respective idler wheel and the respective output shaft 32 or 34 can be synchronized by means of the friction surfaces and therefore by means of the gear clutch which forms a synchronization, in particular a friction synchronization. In this case, the respective sliding sleeves 42, 44, 46 and 48, the respective synchronizer ring and the clutch bodies or the respective idler wheel, also referred to as gear wheel, each have a toothing. The toothing of the respective sliding sleeve 42, 44, 46 and 48 is also referred to as first toothing, and the respective shifting toothing of the idler wheel or gear wheel is also referred to as second toothing. The toothing of the synchronizer ring is also referred to as third toothing.

The respective sliding sleeve 42, 44, 46, or 48 is also referred to as clutch sleeve. In order to connect the respective gear wheel (idler wheel) to the respective output shaft 32 or 34 in a positive-locking and non-rotatable manner by means of the respective clutch sleeve, the respective clutch sleeve is moved translationally relative to the gear wheel in the axial direction of the respective gear wheel and is therefore axially displaced, wherein the respective clutch sleeve is axially displaced on the respective gear wheel, i.e., moved in the direction of the respective gear wheel, in particular such that the first toothing of the respective clutch sleeve engages with the respective second toothing of the respective gear wheel. Moreover, the respective gear has a gear transmission ratio, also referred to as transmission ratio, which is formed by the intermeshing toothed wheels of the respective gear. It can be provided here that the gears differ from one another in terms of their respective gear transmission ratios.

It is preferably provided here that teeth of the first toothing are flat or planar or else slightly rounded on the end face thereof which faces the second toothing in the axial direction, while for example teeth of the second toothing are flat or planar or else slightly rounded on the end face thereof which faces the first toothing in the axial direction. As a result, what is referred to as a tooth-on-tooth position can arise between the first toothing and the second toothing. Such a tooth-on-tooth position can prevent the teeth of the first toothing from being able to be inserted in the tooth gaps of the second toothing, and so such a tooth-on-tooth position can prevent the toothings from being brought into engagement with one another.

Therefore, a method for operating the dual-clutch transmission 10 is provided, wherein, in the context of the method, tooth-on-tooth positions between the respective first toothing and the respective second toothing are resolved, i.e., eliminated. To this end, between the first toothing of the respective clutch sleeve and the second toothing of the respective gear wheel, during an engaging operation for engaging the respective gear, a relative rotation between the first toothing and the second toothing, i.e., a relative rotation between the respective clutch sleeve and the respective gear wheel, is effected by means of a twisting torque which acts on the respective gear, in particular on the respective clutch sleeve. The twisting torque is a torque which acts on the respective gear, in particular on the respective clutch sleeve, in order to effect such a relative rotation between the respective clutch sleeve and the respective gear wheel that the respective tooth-on-tooth position is eliminated, i.e., resolved.

In order here to be able to achieve a particularly advantageous and in particular quiet, low-wear and smooth operation of the dual-clutch transmission 10, the twisting torque is the same size for all gears, and a respective clutch torque for the respective friction clutch 24 or 26 required to effect the twisting torque is calculated based on the respective gear transmission ratio. This means that the twisting torque is effected by means of the respective friction clutch 24 or 26 which belongs to the sub-transmission 12 or 14 whose gear is engaged or is to be engaged during the engaging operation, in particular such that the respective friction clutch 24 or 26 is at least partially closed. As a result, the clutch torque set is transmitted from the drive shaft 22 to the respective input shaft 16 or 18 via the respective friction clutch 24 or 26. The twisting torque which acts on the clutch sleeve and rotates same relative to the respective gear wheel results from the clutch torque depending on the gear transmission ratio.

It is conceivable for the method according to the invention to be applied to dual-clutch transmissions with for example electromechanically actuated gear selectors.

In the respective engaging operation, the respective clutch sleeve is displaced by means of a gear selector. The gear selector is for example a gear selector piston which is moved translationally in particular in the axial direction of the respective output shaft 32 or 34 and is therefore axially displaced, in order for example to axially displace a respective selector fork, and via the respective selector fork, the respective clutch sleeve. To this end, a fluid, in particular a liquid, is applied to the gear selector piston, with the fluid having a pressure. This means that for example the pressure is applied to the gear selector. Furthermore, it can be provided that the fluid is applied to the gear selector by means of an electrically actuatable valve, such that the fluid, and therefore the pressure, is applied electrohydraulically to the gear selector and therefore to the respective clutch sleeve. This therefore provides electrohydraulic actuation of the gear selector and therefore the respective clutch sleeve.

The dual-clutch transmission 10 is for example operated by means of an electronic computing unit, which is also referred to as electronic control unit or transmission control unit. The transmission control unit can for example control the respective friction clutch 24 or 26 in order thereby to set or effect the clutch torque and consequently the twisting torque and/or to solicit the twisting torque. The soliciting of the twisting torque is therefore to be understood for example to mean that the transmission control unit, in particular a module of the transmission control unit, solicits effecting or exerting the twisting torque, for example by the respective friction clutch 24 or 26 or by another module of the transmission control unit.

In order to engage the respective gear, the respective clutch sleeve is for example displaced into an end position. It was found to be advantageous to generate an at least substantially constant, gear-dependent twisting torque at an exact point in time of the engaging operation, in order to be able to reach the end position of the respective clutch sleeve or the respective gear. This twisting torque makes it possible to eliminate the tooth-on-tooth position which can arise because of the flat tooth geometry, and so the respective clutch sleeve can then be guided into its end position. The tooth-on-tooth position can occur, for example, between what is referred to as a synchronization position and an engaging position of the respective clutch sleeve. At the point in time of the engaging operation, the exact synchronization position and what is referred to as the "kiss point" of the respective clutch are preferably known. "Kiss point" is to be understood to mean an actuation state in which clutch discs of the respective clutch are just touching. The twisting torque is preferably solicited when a position of the gear selector, also referred to as gear selector position, exceeds a predefined threshold value, in particular by a predefined amount. In particular, the twisting torque is solicited when the gear selector position is greater than the previously learnt synchronization position plus 0.2 millimeter (mm), minus what is referred to as a fork deflection. The fork deflection is to be understood to mean a preferably elastic deformation, in particular deflection, of the selector fork which occurs during the engaging operation and which is subtracted from the synchronization position. In other words, a setpoint position is calculated by 0.2 mm being added to the previously learnt synchronization position, and the fork deflection then being subtracted. If the determined gear selector position exceeds this setpoint position, the twisting torque is solicited.

It is preferably further provided that the twisting torque is solicited, in particular by the transmission control unit, when a rotational speed difference between the respective clutch sleeve and the respective gear wheel has reduced to a value which is in a range from 10 revolutions per minute inclusive to 40 revolutions per minute inclusive, in particular which is 20 revolutions per minute. The twisting torque is preferably solicited, in particular by the transmission control unit, when it is determined that a speed of the gear selector is greater than 20 to 60 millimeters per second (mm/s), in particular greater than 40 mm/s. The speed is for example the speed at which the gear selector is axially displaced. In other words, the twisting torque is preferably solicited when the gear selector speed is once again greater than 20 to 60 mm, in particular once again greater than 40 mm/s.

In order to exclude distortion of the gear selector position by the fork deflection, dependent for example on the above-mentioned pressure, the fork deflection is subtracted out from the determined gear selector position in a position query during which the gear selector position is determined. To this end, the fork deflection is calculated out of the determined, in particular detected, gear selector position, or is subtracted therefrom. The gear selector position is detected for example by means of a sensor, in particular a Hall sensor.

The twisting torque is preferably 10 newton-meters (Nm). It has proven particularly advantageous if the twisting torque is in the range from 5 Nm inclusive to 15 Nm inclusive. It has been found that the fork deflection is for example approximately 0.3 mm at a pressure of 5 bar. In order for example to generate the same twisting torque of for example 10 Nm for each gear at the respective gear, in particular at a respective synchronization point, in particular at the respective clutch sleeve, of the respective gear, the clutch torque is back-calculated starting from the twisting torque and using the gear transmission ratio. The twisting torque acting on the respective gear is for example the mathematical product of the respective gear transmission ratio and the clutch torque, and so for example in order to determine the clutch torque, the twisting torque is divided by the gear transmission ratio. The result of the mathematical division is the clutch torque, which is for example set at the respective clutch.

For example, in engaging operations as a part of high-load shifting operations, in particular as soon as the twisting torque is solicited, the pressure, also referred to as gear selector pressure, is simultaneously set to a constant level, which is, for example, in the range from 3 bar inclusive to 5 bar inclusive, in particular is 4 bar. The ratio of pressure to twisting torque is for example selected such that the clutch torque can overcome the axial force at the gear selector. If for example the tooth-on-tooth position cannot be resolved, i.e., not eliminated, the clutch torque is increased, with the gear selector pressure then for example remaining unchanged.

In engaging operations in the course of low-load and/or smooth shifting, a constant twisting torque is for example likewise solicited, which is for example the same for each gear, however no constant gear selector pressure is then set, but rather the gear selector pressure is for example lowered to a target value starting from a starting value. The starting value is for example 3.5 bar or is in a range from 3 bar inclusive to 5 bar inclusive, with the target value possibly being for example 2 bar or being in a range from 1.5 bar inclusive to 2.5 bar exclusive. The emphasis here is not on shifting speed but rather on smooth operation, in particular in terms of noise and pressure.

LIST OF REFERENCE CHARACTERS

1 Forward travel gear
2 Forward travel gear
3 Forward travel gear
4 Forward travel gear
5 Forward travel gear
6 Forward travel gear
7 Forward travel gear
10 Dual-clutch transmission
12 First sub-transmission
14 Second sub-transmission
16 Input shaft
18 Input shaft
20 Drive engine
22 Drive shaft
24 Friction clutch
26 Friction clutch
28 Electric machine
30 Parking brake
32 Output shaft
34 Output shaft
36 Toothed wheel
38 Toothed wheel
40 Toothed wheel
42 Sliding sleeve
44 Sliding sleeve
46 Sliding sleeve
48 Sliding sleeve
R Reverse gear
Z1-13 Toothed wheel

The invention claimed is:
1. A method for operating a dual-clutch transmission (10) which includes:

two sub-transmissions (12, 14) each with an input shaft (16, 18) which is connectable via a friction clutch (24, 26) to an output shaft (22) of a drive engine (20); and a plurality of gears (1, 2, 3, 4, 5, 6, 7, R) with respective gear transmission ratios, wherein each of the plurality of gears are shiftable using a respective friction-synchronized gear clutch, wherein the gear clutches have a respective toothing of a sliding sleeve (42, 44, 46, 48) and a respective toothing of a respective gear wheel (Z1, Z3, Z5, Z7, Z9, Z11, Z12, Z13), wherein respective contact surfaces of the respective toothing of the sliding sleeve (42, 44, 46, 48) and the respective toothing of the respective gear wheel are flat or slightly rounded;

and comprising the steps of:

wherein, to resolve a respective tooth-on-tooth position between a toothing of a sliding sleeve (42, 44, 46, 48) and a toothing of a gear wheel (Z1, Z3, Z5, Z7, Z9, Z11, Z12, Z13)) during an engaging operation for the respective gear, a relative rotation between the toothing of the sliding sleeve (42, 44, 46, 48) and the toothing of the gear wheel (Z1, Z3, Z5, Z7, Z9, Z11, Z12, Z13) is effected by a twisting torque which acts on the respective gear (1, 2, 3, 4, 5, 6, 7, R), wherein the twisting torque is a same size for all of the plurality of gears (1, 2, 3, 4, 5, 6, 7, R), and wherein a respective clutch torque for the respective friction clutch (24, 26) required to effect the twisting torque is calculated based on a respective gear transmission ratio, which clutch torque is set at the respective friction clutch (24, 26).

2. The method according to claim 1, wherein in the engaging operation, the sliding sleeve (42, 44, 46, 48) is displaced by a gear selector.

3. The method according to claim 2, wherein the twisting torque is solicited by an electronic control unit of the dual-clutch transmission (10) when a position of the gear selector exceeds a predefined threshold value by a predefined amount.

4. The method according to claim 1, wherein the twisting torque is solicited by the electronic control unit when a rotational speed difference between the sliding sleeve (42, 44, 46, 48) and the gear wheel (Z1, Z3, Z5, Z7, Z9, Z11, Z12, Z13) has reduced to a value which is in a range from 10 revolutions per minute inclusive to 40 revolutions per minute inclusive.

5. The method according to claim 2, wherein the twisting torque is solicited by an electronic control unit of the dual-clutch transmission (10) when it is determined that a speed of the gear selector is greater than 20 to 60 millimeters per second.

6. The method according to claim 2, wherein in the engaging operation, the gear selector has a constant hydraulic pressure applied to it from a start of a soliciting of the twisting torque to an end of the engaging operation.

7. The method according to claim 1, wherein the twisting torque is in a range from five newton-meters inclusive to 15 newton-meters inclusive.

8. A method for operating a dual-clutch transmission, comprising:

resolving a tooth-on-tooth position between a toothing of a sliding sleeve and a toothing of a gear wheel of a gear during an engaging operation of the gear by effecting a relative rotation between the toothing of the sliding sleeve and the toothing of the gear wheel by a twisting torque which acts on the gear.

* * * * *